United States Patent
Hirrien et al.

(10) Patent No.: US 9,676,006 B2
(45) Date of Patent: Jun. 13, 2017

(54) METHOD FOR THE SORTING OF CONTAMINATED MATTER IN CONTINUOUS FLOW AND CORRESPONDING DEVICE

(71) Applicant: GRS Valtech, Vaulx-en-Velin, Paris (FR)

(72) Inventors: Matthieu Hirrien, Villeurbanne (FR); Marc Messalier, Saint Michael d'Euzet (FR)

(73) Assignees: GRS VALTECH, Paris (FR); AREVA NC, Courbevoie (FR)

(*) Notice: Subject to any disclaimer, the term of this patent is extended or adjusted under 35 U.S.C. 154(b) by 40 days.

(21) Appl. No.: 14/762,265

(22) PCT Filed: Jan. 31, 2014

(86) PCT No.: PCT/EP2014/051879
§ 371 (c)(1),
(2) Date: Jul. 21, 2015

(87) PCT Pub. No.: WO2014/122068
PCT Pub. Date: Aug. 14, 2014

(65) Prior Publication Data
US 2015/0352598 A1    Dec. 10, 2015

(30) Foreign Application Priority Data
Feb. 7, 2013   (FR) ..................... 13 51039

(51) Int. Cl.
*B07C 5/34* (2006.01)
*B07C 5/346* (2006.01)
(Continued)

(52) U.S. Cl.
CPC .............. *B07C 5/346* (2013.01); *B07B 15/00* (2013.01); *G01T 1/167* (2013.01)

(58) Field of Classification Search
CPC ..... B07C 5/02; B07C 5/346; B07C 2201/006; G01T 1/167; G01T 7/08
See application file for complete search history.

(56) References Cited

U.S. PATENT DOCUMENTS 3,052,353 A * 9/1962 Pritchett ................. B07C 5/346
                                                         209/558
3,665,188 A * 5/1972 Gutmann ................. G01T 7/08
                                                         250/389
(Continued)

FOREIGN PATENT DOCUMENTS

FR       89 029 E      4/1967
GB       939537        10/1963
(Continued)

OTHER PUBLICATIONS

PCT/EP2014/051879 International Search Report dated Apr. 16, 2014 (4 pages including English translation).

*Primary Examiner* — Joseph C Rodriguez
(74) *Attorney, Agent, or Firm* — Brinks Gilson & Lione; G. Peter Nichols (57) ABSTRACT

A method for sorting, in a continuous flow, contaminated materials, which includes: conveying materials from a point (A) to a point (B) by means of a conveyor; measuring the radioactive activity by means of a first sensor between the points (A) and (B) on the top surface (FSUP) of the first conveyor; and sorting the materials by means of a sorting device. The method may include measuring the radioactive activity of the contaminated material by means of a second sensor, either on the top surface (FSUP) of the conveyor and upstream from the point (A), or below the bottom surface (FINF) of said conveyor; calculating a differential measurement between a measurement from the second sensor and from the first sensor; and restricting the sorting to the (Continued)

comparison between a threshold value and the measurement from the first sensor or the differential measurement.

14 Claims, 2 Drawing Sheets

(51) Int. Cl.
*B07B 15/00* (2006.01)
*G01T 1/167* (2006.01)

(56) References Cited

U.S. PATENT DOCUMENTS

| | | | | | |
|---|---|---|---|---|---|
| 4,361,238 | A | * | 11/1982 | Kealy | B07C 5/366 209/576 |
| 4,580,684 | A | * | 4/1986 | Bohme | G01N 23/12 209/549 |
| 4,599,513 | A | * | 7/1986 | Prisco | B07C 5/346 250/336.1 |
| 4,762,280 | A | * | 8/1988 | Prisco | B07C 5/02 100/39 |
| 4,866,277 | A | * | 9/1989 | Johnson | G01T 1/18 250/336.1 |
| 5,017,788 | A | * | 5/1991 | Humphrey | G01T 7/08 250/336.1 |
| 5,076,502 | A | * | 12/1991 | Kitaguchi | B07C 5/346 209/576 |
| 5,166,526 | A | * | 11/1992 | Dietzel | G01N 30/62 250/430 |
| 5,705,818 | A | * | 1/1998 | Kelbel | B61L 1/10 250/361 R |
| 5,866,907 | A | * | 2/1999 | Drukier | G01N 33/60 250/328 |
| 8,324,579 | B2 | * | 12/2012 | Ito | G01T 1/167 250/356.2 |
| 9,566,615 | B2 | * | 2/2017 | Fujii | B07C 5/3416 |
| 2010/0133439 | A1 | * | 6/2010 | Iwatschenko-Borho | G01T 1/167 250/361 R |
| 2016/0144409 | A1 | * | 5/2016 | Kamada | B07C 5/346 209/576 |

FOREIGN PATENT DOCUMENTS

| | | |
|---|---|---|
| GB | 2 017 294 | 10/1979 |
| GB | 2 022 824 | 12/1979 |
| WO | WO 2011/082728 | 7/2011 |

* cited by examiner

METHOD FOR THE SORTING OF CONTAMINATED MATTER IN CONTINUOUS FLOW AND CORRESPONDING DEVICE

This application claims priority to International Application No. PCT/EP2014/051879 filed Jan. 31, 2014; and to French Application No. 1351039 filed Feb. 7, 2013; the entire contents of each are incorporated herein by reference.

The present invention relates to the field of the sorting of matter contaminated by radionuclides.

For the sake of brevity, by "contaminated matter" is meant matter that is contaminated or potentially contaminated, that is to say, liable to be contaminated by at least one radionuclide, possibly mixed with uncontaminated matter.

Contaminated matter is heterogenous. On the one hand, it is heterogenous in its radionuclide content: two samples of contaminated matter can have different radionuclide content, including a null content for an uncontaminated sample. On the other hand, it can be heterogenous in nature: the matter for example can be sand, earth, soil, stones, roots, gravel, concrete, rice, wheat, mud and any other organic or non-organic matter that can be shoveled. Hence, it can be solid or stodgy matter, without any particular restriction regarding granulometry. Likewise, there is no particular limit in terms of humidity, dryness and water content of the contaminated matter other than their capacity to be shoveled and transported on conveyors, particularly of the belt type ones.

Sorting is achieved prior to a later step of treating the contaminated matter, with more complicated technical means, not described here.

Sorting hence, makes it possible to significantly reduce the quantities of contaminated matter to be treated.

More specifically, the invention relates to according to a first of its purposes a sorting method in continuous flow of contaminated matter comprising steps consisting in:
 conveying contaminated matter from a supply point (A) to a sorting point (B) by a first conveyor,
 measuring the radioactive activity of the contaminated matter by a first sensor arranged between the supply point (A) and the sorting point (B), and whereof the sensitive side is facing the upper side (FSUP) of the first conveyor, and
 sorting the contaminated matter at the sorting point (B), by means of a sorting device.

It is substantially characterized in that it further comprises steps consisting in:
 measuring the radioactive activity of the contaminated matter by a second sensor:
 Either whereof the sensitive side is facing the upper side (FSUP) of the first conveyor and arranged upstream of the supply point (A),
 Or whereof the sensitive side is facing the lower side (FINF) of the first conveyor,
 Calculating a differential measurement consisting in subtracting the measurement value of the second sensor from that of a measurement of the first sensor, and
 Subjecting the sorting step to the result of the comparison between a threshold value and
 the measurement value of the first sensor, or
 the differential measurement value.

In an embodiment, it is further provided a step of comparing the measurement of the first sensor with the threshold value, the step of calculating the differential measurement being implemented at least when the measurement value of the first sensor becomes higher than the threshold value.

In an embodiment, it is further provided steps consisting of:
 defining a set of known positions (P) on the first conveyor, associating to each position (P) a corresponding measurement of the first sensor and a corresponding measurement of the second sensor, and
 the step of differential measurement consisting in subtracting the measurement value registered by the second sensor for a given position (P) from the measurement value registered by the first sensor for this same position (P).

In an embodiment, it is further provided:
 an initialization step consisting in registering to a memory the measurement value of at least one of the sensors, coupled to each position (P) of the first empty conveyor, and
 a step consisting in subtracting the measurement value of the initialization step:
 either from the measurement value of the first sensor when the first conveyor is in full load,
 or from the differential measurement.

In an embodiment, it is further provided a step consisting in cleaning the belt of the first conveyor.

In an embodiment, the sorting device can selectively adopt two positions:
 a first position when the measurement by the first sensor, or the differential measurement is higher than the threshold value; and
 a second position when the measurement by the first sensor, or the differential measurement is lower than the threshold value,
 the method further comprising at least one of the steps consisting in:
 adopting the first position in advance when the measurement by the first sensor, or the differential measurement becomes higher than the threshold value, and
 adopting the second position with a delay when the measurement by the first sensor, or the differential measurement becomes lower than the threshold value.

In an embodiment, it is further provided that a step of pre-screening of the contaminated matter upstream of the introduction of said matter on the first conveyor.

According to another of its purposes, the invention relates to a device for sorting contaminated matter, liable to implement the method according to the invention, and comprising:
 a first conveyor, substantially horizontal,
 mechanical means for adjusting the height of the contaminated matter on the first conveyor,
 a first sensor at least partially shielded, and whereof the sensitive side is facing the upper side (FSUP) of the first conveyor,
 a second sensor at least partially shielded, and whereof the sensitive side is facing the lower side (FINF) of the first conveyor,
 a gravitational sorting device able to selectively adopt two positions, and
 a computer, configured to subject the positioning of the sorting device to the result of the comparison between a threshold value and
 the measurement value of the first sensor, or
 the differential measurement value consisting in subtracting the measurement value of the second sensor from that of a measurement of the first sensor.

In an embodiment, it is further provided one at least of the following elements:
- a second conveyor, in series with the first conveyor, whereupon the contaminated matter is discharged by gravity,
- a supply and storage device, from which the contaminated matter can be discharged by gravity at supply point (A) of the first conveyor.

In an embodiment, it is provided that the second conveyor is slanted at a positive angle with respect to the plane of the first conveyor, in order to raise the contaminated matter with respect to the height of the supply point (A) and wherein the sorting device comprises a pendular hopper.

In an embodiment, it is further provided at least one of the following elements:
- a casing wherein the first sensor is inserted, said casing being shielded and protecting all sides of said first sensor except for the sensitive surface of said first sensor, said sensitive surface of said first sensor being protected by a protective member protecting from possible blows and soiling, wherein if said protective member is a shielding, then its attenuation coefficient is lower than that of the shielding of the other sides of said sensor;
- a casing wherein the second sensor is inserted, said casing being shielded and protecting all the sides of said second sensor except for the sensitive surface of said second sensor, said sensitive surface of said second sensor being protected by a protective member protecting from possible blows and soiling, wherein, if said protective member is a shielding, then its attenuation coefficient is lower than that of the shielding of the other sides of said second sensor.

In an embodiment, it is provided that the first conveyor also comprises at least one of the following members:
- a first shielding arranged between the upper side and the lower side of said first conveyor and facing the sensitive surface of the first sensor, and
- a second shielding arranged between the upper sides and lower side of said first conveyor facing the sensitive surface of the second sensor.

Thanks to the invention, the sorting is simple, gravitational and autonomous in energy. It is easy of use and multipurpose.

Other characteristics and advantages of the present invention will become more apparent upon reading the following description given by way of illustration and non limitative example with reference to the accompanying figures in which.

On the figs. the full arrows indicate the travel direction.

Figure 1:
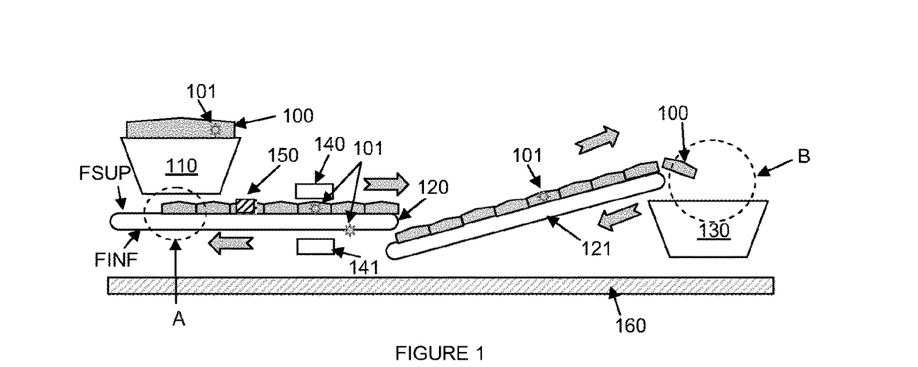
FIG. 1 illustrates an embodiment of the device according to the invention in lateral view.

An embodiment of a device for the sorting of contaminated matter 100 is illustrated in FIG. 1.

The contaminated matter 100 is brought thereto from one or several continuous supply systems, for example a conveyor belt; or in a discontinuous manner, for example building site machines (not represented). They are discharged into a storage and supply device 110.

Storage and Supply Device

Advantageously, the storage and supply device 110, possibly at least partially shielded, is located over a first conveyor 120. Preferably, the storage and supply device 110 makes possible a regular supply of contaminated matter 100 at a substantially constant rate on the upper side FSUP of the first conveyor 120, and exhibits a buffer capacity. For these reasons, a hopper is preferred, which exhibits these two characteristics through its shape alone, and can avoid having to implement controlled means for regulating the supply of contaminated matter on the conveyor, for example in the form of a controlled valve. However such controlled means are not excluded from the scope of the invention. In this instance, the hopper 110 comprises a manual control opening device for example a manual valve. In operation, the manual valve is preferably left open in its maximum opening position. It can be provided to close all or part of the manual valve in the event of a problem on the first conveyor 120.

The hopper 110 gravitationally supplies the first conveyor 120 with contaminated matter 100.

The output of contaminated matter of the first conveyor is substantially regulated by the speed of said first conveyor 120, the equivalent diameter of the opening of the hopper having an influence on the supply output of contaminated matter from the hopper 110 to the conveyor 120.

Conveyor

As is standard, one defines by:
"supply point" A, the location where the contaminated matter is discharged onto the conveyor 120;
"sorting point" B, the location where the contaminated matter is sorted by a sorting device; and
"the conveyor", an assembly of at least a conveyor, particularly a belt conveyor, making it possible to transport the contaminated matter from the supply point to the sorting point.

In this instance, between the supply point A and the sorting point B, the contaminated matter 100 is transported by a first conveyor 120, called extractor, preferably substantially horizontal, that is to say horizontal or slightly slanted, that is to say at an angle preferably lower than 10° with respect to the horizontal, thus simplifying the processing of measurements and reducing the risk that the contaminated matter is discharged upstream of the supply point.

At the end of the first conveyor 120, the contaminated matter is discharged by gravity onto a second conveyor 121, called follower conveyor. In this instance, the second conveyor 121 is a lifting conveyor, that is to say, that it is slanted at a positive angle with respect to the plane of the first conveyor 120 and makes it possible to lift the contaminated matter 100 with respect to the height of the supply point in order to discharge it into the sorting device 130, thus being advantageous with the sorting device 130 using the gravity described hereinafter.

The number of conveyors and the angle of inclination of the possible second conveyor 121 may depend for example on one at least of the following members: the length of the conveyors, the typology of contaminated matter, the available space and the configuration of the ground on the site of use. Here, for more simplicity, only a substantially horizontal ground is considered. In this case, the first conveyor 120 and the second conveyor 121 are arranged on the flat bottom of a transport container.

Preferably, between the supply point A and the first sensor 140 described later, there are provided mechanical means for adjusting the height of the contaminated matter 100 on the first conveyor 120, in this case a mechanical limiter 150. Such a limiter has the advantage of being simple, sturdy, is easily cleaned and does not use energy.

Sorting Device

At the sorting point B, the contaminated matter 100 is automatically sorted by a sorting device 130 according to its radionuclide content, the sorting being subject to the measurements of their radionuclide content described later.

Preferably, a binary sorting device 130 is provided, able to achieve a very rapid sorting. It is provided for example that the sorting device comprises a pendular hopper 130, preferably pneumatic, which may selectively take two positions. The reactivity of such a hopper, that is to say, the time interval for moving from one position to the other, may be less than a second, thus making it possible to obtain very high sorting paces.

For the sake of brevity, only a binary sorting is described here, in this particular case by comparison with a threshold. However, a ternary sorting can be provided, for example by comparison with two thresholds based on the same principle as that already presented. More generally, one can provide a multi-criteria sorting with N criteria in comparison with N–1 thresholds.

It can be provided that when the pendular hopper 130 is in one of its positions, the contaminated matter 100 is discharged by gravity onto the ground, in a first supply device or on a first discharge conveyor 122; and when the pendular hopper 130 is in another of its positions, the contaminated matter 100 is discharged by gravity onto the ground, in a second storage device or onto a second discharge conveyor 123. For example the discharge conveyors 122, 123 are belt conveyors.

The pendular hopper 130 comprises a stationary assembly and a mobile assembly mounted on at least a shaft. The rotation around the shaft makes it possible to tip the mobile portion and selectively orient the contaminated matter towards one position or another (in binary sorting), that is to say in this particular case either towards the discharge conveyor 122 or towards the other discharge conveyor 123. The tipping is for example actuated by pneumatic jacks controlled by solenoid valves. The position of the pendular hopper 130, hence its possible tipping over, is determined by comparing the measurement of radionuclide content of the contaminated matter 100 with a threshold value.

Figure 2:
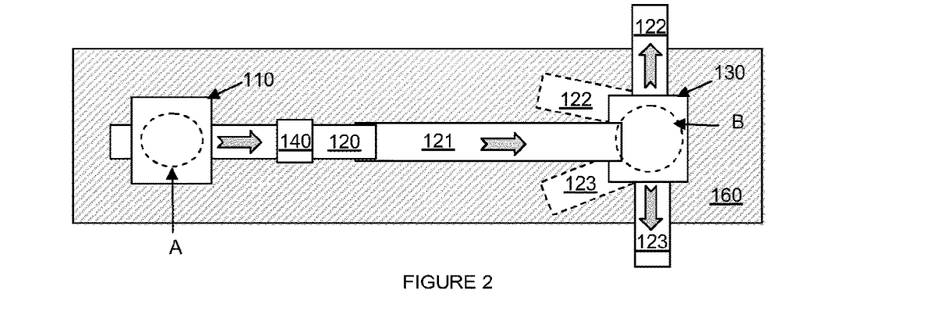
FIG. 2 illustrates an embodiment of the device according to the invention, in top view

In an embodiment, it is provided that the two discharge conveyors 122, 123 are mounted in rotation with at least one rotation axis, preferably such that they can be folded, even positioned in parallel with the extractor conveyor 120 and the follower conveyor 121 during transport and deployed for usage.

On FIG. 2, the transport position is illustrated by dots and the usage position by full lines. In usage position, the angle between a discharge conveyor and the extractor conveyor or follower may be any, higher or lower than 90°. However, preferably, discharge conveyors 122, 123 are perpendicular to the axis of the conveyors 120, 121 and run in opposite directions to each other.

In another embodiment, it is provided that the two discharge conveyors 122, 123 are removably mounted with respect to said structure, by a set of non-illustrated pins, hinges and dowel pins, which also make it possible to optimize the bulk of the set of conveyors 120, 121, 122, 123 during transportation.

First Sensor

Between the supply point A and the sorting point B, the radioactive activity of the contaminated matter is measured by a first sensor 140 or detector, called "measurement sensor", for example a gamma ray detector.

Preferably, the sensitive side of the first sensor 140 is parallel with the belt of the first conveyor 120 and is facing the upper side FSUP of it.

Figure 3:
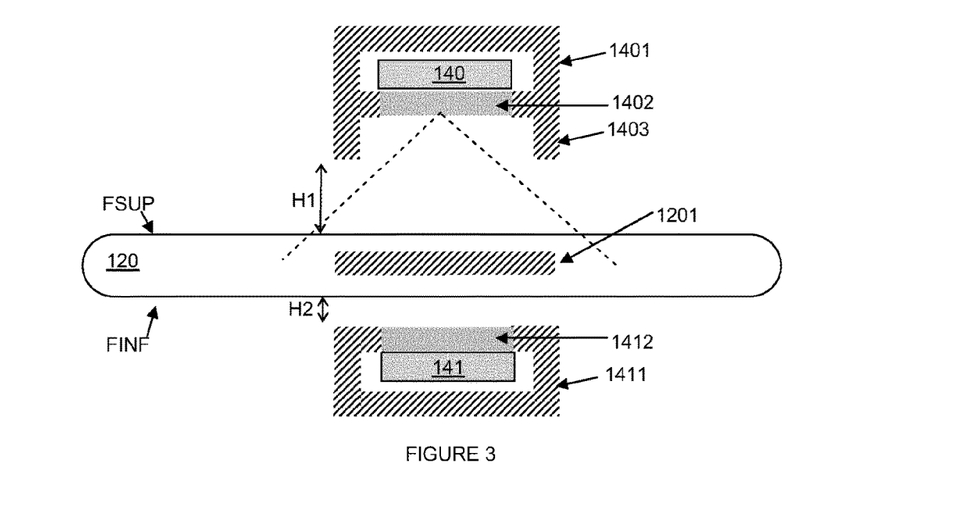
FIG. 3 illustrates an embodiment of the positioning of the sensors according to the invention.

The sensitive surface of the first sensor 140 makes it possible to detect the radiation according to a predetermined solid angle, represented very schematically by the dots in FIG. 3.

Without any particular precautions, not only can the first sensor measure the activity of the contaminated matter present on the conveyor, but also that of all radioactive source at radiation distance, for example emitted by the ground itself (natural telluric radiation) or by the contaminated matter deposited on the ground, or even the hopper, or the cosmic radiation, and thus, whatever the position of this radioactive source with respect to the sensitive surface and the solid angle of the sensor.

In order to increase the reliability of the measurements and reduce the background noise (parasite count), it is advantageously provided to shield the first sensor 140.

In an embodiment, it is provided to leave the sensitive surface of the first sensor 140 in the open air and to shield at least another side, or even all the other sides of the sensor.

In an embodiment, and in reference to FIG. 3, it is provided to protect the sensitive surface of the first sensor 140 by a protective member 1042 and shield at least another side, or even all the other sides of the sensor. For example it is provided a plate, particularly metallic, for example a stainless steel in order to protect from possible blows and soiling.

In an embodiment, it is provided that the protection 1402 is a radiation shielding. It is provided to shield all the sides of the first sensor 140. In this case, it is preferably provided that the attenuation coefficient of the shielding facing the sensitive surface of the first sensor 140 is lower than that of the shielding of the other sides thereto. For example, it is provided to insert the first sensor 140 into the casing 1401.

On FIG. 3, the hatched lines of the shielding 1401 represent a shielding thickness that is higher than that of the thick lines of the protective member 1402 of the sensitive surface. Alternatively or in combination, it can be provided that the material used for the shielding facing the sensitive surface of the first sensor 140 be different from the material used for the shielding of the rest of the casing 1401. It can be provided that the casing 1401 further comprises flanks 1403, optional, in this instance perpendicular to the upper side FSUP of the first conveyor 120, which make it possible to reduce the solid angle of the sensor 140 and protect from lateral stray radiation.

Whatever the embodiment of the shielding, it is preferably provided that only the radiation emitted in the solid angle of the first sensor 140 be detected by it. Thus making it possible, for example for large volumes of contaminated matter to be processed, that the measurements are not distorted by the background noise even if the contaminated matter is placed (before just like after sorting) near the first sensor 140.

Preferably, the first sensor 140 is chosen and arranged in a predetermined position wherein preferably, the totality of the length of the conveyor is covered by its solid angle. For example, for a predetermined solid angle, the height H1 between the upper surface of the first conveyor 120 and the sensitive surface of said first sensor 140 may be adjusted. It can be provided to adjust beforehand the first sensor 140 at this predetermined height H1, or make it possible for an operator to position the first sensor 140 in this operating position, by fixing means adjusted beforehand and not illustrated. The height H1 is higher than or equal to the height at which the mechanical limiter 150 is arranged.

However, a fraction of contaminated matter may remain agglomerated on the conveyor belt 120, 121, thus, presenting the risk of rendering irrelevant measurements by the first sensor.

Advantageously, a second sensor 141 is provided.

Second Sensor

Preferably, the sensitive side of the second sensor 141 is parallel to the belt of the first conveyor 120 and is facing its lower side FINF.

For example the second sensor 141 is identical in all aspects to the first sensor 140.

Likewise, the second sensor 141 is shielded by a shielding. The second sensor 141 may be integrated into a shielded casing 1411 similarly to the shielding of the first sensor 140.

It can be provided to protect the sensitive surface of the second sensor 141 by a protective member 1412 and to shield at least another side, or even all the other sides of the sensor. For example a plate, particularly metallic, for example a stainless steel may be provided to protect from possible blows or soiling.

The protective member 1412 can also be a shielding. Typically, in this case, it can be provided that the attenuation coefficient of shielding of the sensitive surface of the second sensor 141 is lower than that of the shielding of the other sides of said second sensor 141. It can be provided that the casing 1411 further comprises flanks (not represented), optional, which make it possible to reduce the solid angle of the second sensor 141 and protect against lateral stray radiation.

Preferably, the sensitive side of the second sensor 141 is parallel to and is facing the sensitive side of the first sensor 140.

Preferably, the second sensor 141 is configured to exclusively measure the random fluctuation (background noise) and activity of a possible residue of contaminated matter 101 that has remained agglomerated on the lower side FINF of the first conveyor 120, that is to say, such that the radiological activity of the contaminated matter 101 measured by the first sensor 140 on the upper side FSUP of the first conveyor 120 is not detected simultaneously by the second sensor 141.

The second sensor 141 is arranged with respect to the lower side FINF of the first conveyor 120 in a predetermined position in which preferably the total width of the conveyor is covered by the solid angle thereto. For example, for a predetermined solid angle, the height H2 can be adjusted between the lower surface of the first conveyor 120 and the sensitive surface of said second sensor 141. It can be provided to adjust beforehand the second sensor 141 at this predetermined height H2, or to make it possible for an operator to position the second sensor 141 in this operating position, by fixing means adjusted beforehand and not illustrated.

The height H2 may be different from height H1. The solid angle of the second sensor 141 may be different from the solid angle of the first sensor 140.

Shielding the First Conveyor

As little as a residue of contaminated matter (of a few micrometers of equivalent diameter) can emit radiation that is possibly visible by the first sensor 140 or the second sensor 141.

Preferably, a shielding 1201 is provided for the first conveyor 120, in this instance in the form of a plate. The shielding is arranged between the upper side FSUP and the lower side FINF of the first conveyor 120 and faces the sensitive surface of the first sensor 140. When the first sensor 140 and the second sensor 141 are facing each other, as illustrated in FIG. 3, one joint shielding 1201 can be used. Typically, if the second sensor 141 is shifted with respect to the first sensor 140, it is preferably provided to shield the first conveyor 120 by a second shielding (not illustrated), facing the second sensor 141 and arranged between the upper side FSUP and the lower side FINF of the first conveyor 120.

The shielding 1201 makes it possible to limit the detection of radiological activity of the contaminated matter 101 to the upper side FSUP of the first conveyor 120 by the second sensor 141. Reciprocally, it makes it possible to limit the detection of radiological activity of a residue of contaminated matter 101 agglomerated on the lower side FINF of the first conveyor 120 by the first sensor 140. The shielding 1201 hence makes it possible to isolate each sensor 140, 141.

The shielding 1201 of the first conveyor 120 may be interposed between the solid view angle of the first sensor 140 and the solid view angle of the second sensor 141.

It can be provided that the first sensor 140 and the second sensor 141 be symmetrical with respect to a plane symmetry parallel to the conveyor 120, in this instance horizontal and passing through the shielding of the first conveyor 120, thus allowing to be less cumbersome to use a single conveyor 120 shielding. However, the symmetry is not essential. It can be provided that the height H1 be different from the height H2, that the shape of the casings 1401 and 1411 be different or even that the view angle of the sensors 140 and 141 be different.

The shielding of each sensor 140, 141 and of the first conveyor 120 allows for an attenuation depending on the output of natural (cosmic and telluric) and artificial (contaminated matter) dose. In other words, the natural background noise by cosmic or telluric radiation is integrated into the measurements. The detection of radiological activity by the second sensor 141 corresponds to a pollution of the lower side FINF of the first conveyor 120 belt from a residue of contaminated matter 101 or to an anomaly.

For example, it can be provided as shielding for each sensor 140, 141 and for the first conveyor 120 a set of plates of dense material (steel, lead, tungsten . . . ). The nature and thickness of the material may be chosen for example according to the level of ambient or measured radiological activity or a determined attenuation coefficient. For example, steel plates of a 5 cm thickness can be provided.

Thus, the shielding or shieldings makes it possible to reduce the radiation pertaining to the implementation context (cosmic, telluric radiation or radiation from neighboring contaminated matter), which risk creating a static background noise but possibly variable in time, particularly if a stock of contaminated matter is stored in the vicinity.

Belt Cleaning

It can be provided to clean the belt of the first conveyor 120, even continuously.

There can be provided water washing means although they are rather difficult to implement.

It can be provided to mechanically scrub the belt of the first conveyor 120, thus, minimizing the risk of presence of residue of contaminated matter on the lower side FINF and limiting the accumulation of the matter thereto. For this purpose, there are provided known belt scrubbing means, for example a suspended plate supported on springs.

Operation

Sensors 140, 141 are known by the skilled person.

It is preferably provided a continuous flow operation, thus making it possible to sort large volume of contaminated matter.

In operation, the contaminated matter 100 is extracted from the supply hopper 110 by the first conveyor 120, on its upper side. It passes under the limiter 150 then in the solid angle of the first sensor 140 where the radiological activity is measured. The pitch in terms of time of radiological activity measurement is preferably lower than one second and higher than or equal to 0.1 second.

The contaminated matter 100 is then discharged from the first conveyor 120 onto the upper side of the second conveyor 121. The second conveyor 121 is slanted and allows for the contaminated matter 100 to be conveyed at a height higher than that of the supply point A, said height being determined according to various factors, and in particular preferably being at a person's height, thus, facilitating the assembly/disassembly, the cleaning and maintenance, for example between 1 to 1.5 m with respect to the ground. The contaminated matter 100 is then discharged by gravity into a sorting device, in this instance, a pendular hopper 130, which can selectively tip between two positions.

The travel speeds of the first conveyor 120 and second conveyor 121 can depend on their width. For example, the width of the first conveyor 120 and the second conveyor 121 is substantially the same, of the order of 1 meter.

Preferably, the travel speed ratio of the first conveyor 120 and the second conveyor 121 is constant in time. The travel speed of a conveyor preferably depends on its width. By way of illustration only, the travel speed of the first conveyor 120 can range between 0.1 and 1 m/s.

Control

At sorting point B, as previously shown, depending on the position of the pendular hopper 130, the contaminated matter 100 is discharged at the output thereto, either on a first discharge conveyor 122, or on a second discharge conveyor 123. For example, it is provided that the first discharge conveyor 122 is used to extract the matter whereof the radiological activity is lower than the threshold value, and that the second discharge conveyor 123 is used to extract the matter whereof the radiological activity is higher than the threshold value.

It is provided that the position of the pendular hopper 130, that is to say its tilting movement, is at least subject to the measurement of the first sensor 140.

Typically, the measurement value of the first sensor 140 is compared with a threshold value registered in a memory and preferably parameterizable. According to the result of the comparison, the pendular hopper 130 is selectively oriented, in this instance by tilting, in one position if the result of the comparison is positive, and oriented in another position, in this instance in the other position, if the comparison result is negative. The threshold value is also called sorting set-point.

If a fraction or a residue of ionizing contaminated matter 101 remains stuck to the conveyor belt of the first conveyor 120, its radiation risks being measured by the first sensor 140 with each passage, hence rendering its measurement irrelevant.

This is the reason why it can be provided a differential measurement consisting in subtracting the measurement value of the second sensor 141 from that of a measurement of the first sensor 140. Thus, the position of the pendular hopper 130, that is to say its tilting movement, can be further subject to the measurement of the second sensor 141, in this instance by means of this differential measurement.

Differential Measurement

According to the position of the second sensor 141 and the environment, the second sensor 141 can substantially measure the same background noise, related to the same sources as those of the first sensor. In practice, this is not always the case.

It can be provided that the differential measurement between the first sensor 140 and the second sensor 141 is only implemented if the measurement of the first sensor 140 becomes higher than the threshold value.

Preferably, it can be provided that the differential measurement is achieved in the following manner:

The first sensor 140 and the second sensor 141 each carry out measurements, preferably continuously.

Figure 4:
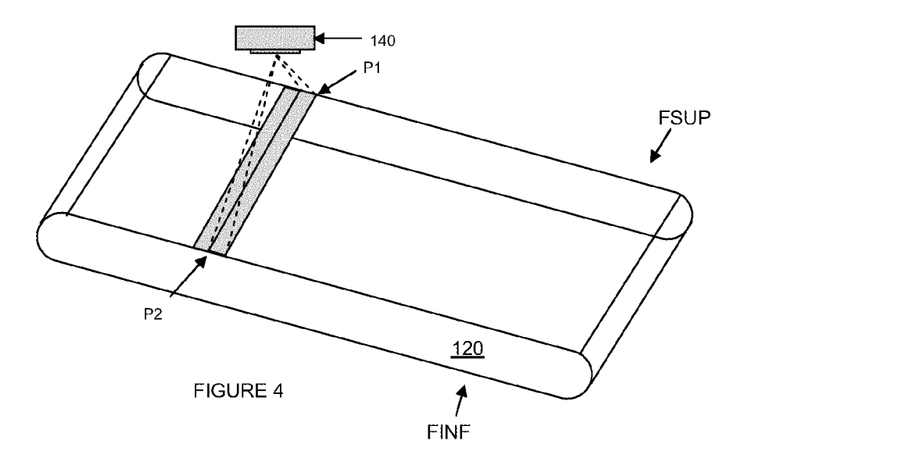
FIG. 4 illustrates the solid angle of the first sensor in partially exploded view of the extractor conveyor.

On the first conveyor 120, it can be defined a set of known positions P, for example thanks to an encoder, in this instance an encoder disk.

On FIG. 4, only two successive positions P1 and P2 are illustrated, the distance separating a first position P1 and a second position P2 on the first conveyor 120 preferably corresponding to the pitch of the measurement of the first sensor 140 in the travel direction. By way of illustration, the measurement pitch in terms of distance may be of the order of a few centimeters.

The upper side FSUP of the first conveyor 120 comprises matter 100 whereof the activity is measured by the first sensor 140 and registered to a memory coupled to a computer. Thus, it is associated the position P corresponding to this measurement such as to create a first value pair of the measurement of the first sensor 140/position P in a memory.

In operation, the contaminated matter travels on the first conveyor 120, then is discharged onto the second conveyor 121. Positions P (P1 then P2) thus, pass onto the lower side FINF of the first conveyor 120.

Similarly, the second sensor 141 measures and registers to a memory coupled to a computer, the activity of the possible residual matter 101 on the lower side FINF of the first conveyor 120.

Thus it is associated the position P corresponding to this measurement such as to create a second value pair of the measurement of the second sensor 141/position P in a memory.

The measurement pitch in terms of distance of the second sensor 141 can be different from that of the first sensor 140.

Thus, it is known the measurement value of the first sensor 140 and that of the second sensor 141 for a same given position P. The differential measurement may thus be achieved. To this end, based on the first and second pair of values, the measurement of the radiological activity for a given position P by the second sensor 141 registered to a memory coupled to a computer is subtracted from the measurement carried out by the first sensor 140 for the same position P.

By way of example, if the measurement carried out by the first sensor 140 is higher than the threshold value but the differential measurement is lower than the threshold value, then it means on the one hand that residue has probably remained stuck to the first conveyor 120, and on the other hand, that the corresponding volume of contaminated matter arriving at the hopper in fact comprises matter whereof the activity is lower than the threshold value. Consequently, the pendular hopper 130 is tilted towards the corresponding discharge conveyor, in this instance, the first discharge conveyor 122. If the pendular hopper 130 was already in this position, it is maintained thereto.

On the second conveyor 121, similarly, it is defined a set of known positions P', for example thanks to an encoder, in this instance an encoder disk. There is a correspondence between a given position P on the first conveyor 120 and a corresponding position P' on the second conveyor 121. For example, FIG. 5, the matter in position P1 on the first conveyor 120 is discharged in position P1' onto the same conveyor 121, and likewise for P2 and P2'.

Figure 5:
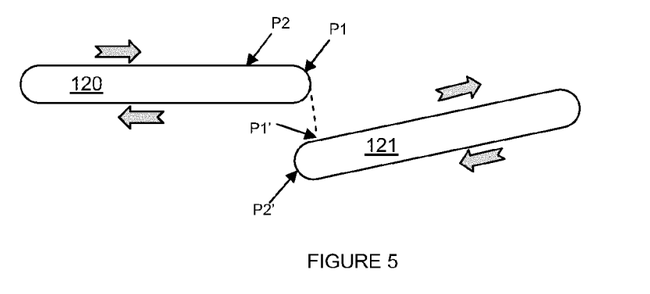
FIG. 5 illustrates the correspondence between positions P of the extractor conveyor and P' of the follower conveyor.

As positions P' are known, the position of the pendular hopper 130 can be controlled at a distance D1' separating said position P1' from a reference position P'ref corresponding for example to the end of the second conveyor, that is to say, corresponding to the position of the pendular hopper 130 at the sorting point B or a point upstream. For example, if the pendular hopper 130 is tilted towards the first discharge conveyor 122 but the measurement possibly differential, implies that it must be tilted towards the second discharge conveyor 123, it is provided that the pendular hopper 130 is tilted as soon as position P1' reaches reference position P'ref.

Figure 6:
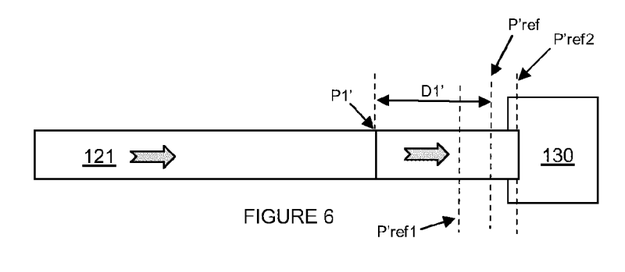
FIG. 6 illustrates, in top view of the follower conveyor, the distance D1' separating the position P1' and a reference position P'ref.

Preferably, it is provided an augmenting approach, see FIG. 6, making it possible to reduce contamination risks. For this purpose:

When the measurement, possibly differential, becomes higher than the threshold value, it can be provided that the pendular hopper 130 is tilted in advance, that is to say, as soon as the position P1' reaches a reference position P'ref1 upstream of P'ref;

When the measurement, possibly differential becomes lower than the threshold value, it can be provided that the pendular hopper 130 is tilted with delay, that is to say as soon as the position P1' reaches a reference position P'ref2 downstream of P'ref.

Thus, it is possible that non contaminated matter be sorted and considered as contaminated but the opposite does not hold true.

As already described, it is preferred to control the position of the pendular hopper 130 according to positions P, P'.

Alternatively, since the length and speed of travel of the second conveyor 121 are also known, it can be computed, thanks to a computer, the moment at which the position P1' is at the downstream end (pendular hopper side 130) of the second conveyor 121 and the position of the pendular hopper 130 controlled according to time.

The computer is a means for controlling the positioning of the sorting device 130 according to the data from sensors 140 and 141. The computer can be any type of programmable IT tool, a processor, a microprocessor, a central processing unit, etc.

The advantage of a controlling according to the position rather than according to time remains due to the fact that if conveyors 120, 121 must be stopped, the position remains known, hence, only the arrival time of the contaminated matter to the pendular hopper 130 changes.

Furthermore, as positions P on the first conveyor 120 are known, that the width of the conveyor 120 is known, that the contaminated matter substantially covers the entirety of this width and that its height is known and is substantially equal to the height of the mechanical limiter 150, the volume of a sample of contaminated matter passing under the first sensor 140 can be computed. This sample volume can further be chosen, for example by making the height of the mechanical limiter 150 or the solid angle of the first sensor 140, vary. The same applies for the second sensor 141.

Energy Supply

Preferably, a generating set is provided making it possible to supply all or part of the set of conveyors 120, 121, 122, 123, sensors 140, 141 and the computer with electrical energy, and a compressor for supplying the pendular hopper 130 in compressed air. Power regulation and electrical control cabinets can also be provided.

Autonomy

The sorting system comprising the supply hopper 110, the first conveyor 120, positioned with respect to the supply hopper 110, the second conveyor 121, the pendular hopper 130 and the first discharge conveyor 122 and the second discharge conveyor 123 in transport position, is advantageously configured to be removable and transportable in a transport container (typically of 40 feet). According to the volume of the latter, the generating set can be transported in a second transport container.

Thanks to the generating set, the sorting system may be deployed anywhere, independently from the accessibility of a plug.

In operation, the sorting system can be deployed on the bottom of the transport container.

Advantageously, the sorting system can be deployed in only a few hours.

It can be provided a step of pre-screening of contaminated matter upstream of the introduction of said matter on the first conveyor 120, thus, further improving the sorting efficiency, for example by a step of mechanical filtering (typically by bar railings or screening) at the input of the supply hopper. In this instance, a slanted grid is provided on the upper portion of the supply hopper.

Thanks to the invention, it is possible to sort more than 100 tons of contaminated matter per hour.

Initialization

It can be provided a step of initialization or calibration wherein at least the first conveyor is empty.

In an embodiment, it is provided to register to a memory, the measurement value of one at least of the sensors 140, 141, the first conveyor 120—not loaded with matter 100—able to be in operation or shut down. If it is in operation, it is preferably provided to carry out the measurements on at least a complete rotation of the belt thereto.

In this embodiment, it is not necessary to couple the measurements to the positions P. Thus, the ambient radiation, typically telluric and cosmic can be measured.

In another embodiment, it is provided to register to a memory the measurement value of one at least of the sensors 140, 141, coupled to each position P of the first empty conveyor 120. Thus, the radiation of possible residue 101 on the first conveyor 120 can be measured.

It can be provided to subtract the measurement value of any one of the two embodiments at the step of initialization from the measurement value of the first sensor when the first conveyor 120 is loaded, or from the differential measurement such as aforementioned.

The step of initialization can come before, for example during a first implementation, before the matter 100 is extracted by the first conveyor 120. If the first conveyor has already conveyed contaminated matter, it is provided to empty it, and even wash it.

Thanks to the initialization step, the global background noise can thus be integrated into the measurements when the first conveyor is loaded. If contaminated matter is stored at radiation distance from the first conveyor and is regularly stocked up, it is preferably provided to implement an initialization step at each supply, thus making it possible to take into account the progress of background noise over time.

The invention claimed is:

1. A method for sorting contaminated matter in continuous flow comprising:
   conveying contaminated matter from a supply point to a sorting point by a first conveyor;
   measuring the radioactive activity of the conveyed contaminated matter by a first sensor arranged between the supply point and the sorting point, wherein the first sensor has a sensing side that faces an upper side of the first conveyor;
   sorting the contaminated matter at the sorting point;
   measuring the radioactive activity of the contaminated matter by a second sensor, wherein the second sensor has a sensing side that faces a lower side of the first conveyor;
   calculating a differential measurement by subtracting a measurement value of the second sensor from that of a measurement of the first sensor, and
   subjecting the sorting step to the result of a comparison between a threshold value and the measurement value of the first sensor or the differential measurement value.

2. The method according to claim 1, further comprising comparing the measurement of the first sensor with the threshold value, the step of calculating the differential measurement being implemented at least when the measurement value of the first sensor becomes higher than the threshold value.

3. The method according to claim 1, further comprising:
   defining a set of known positions on the first conveyor; and,
   associating to each position a corresponding measurement of the first sensor, and a corresponding measurement of the second sensor, wherein
   the step of differential measurement includes subtracting the measurement value registered by the second sensor for a given position of the measurement value registered by the second sensor for this same position.

4. The method according to claim 3, further comprising:
   a step of initialization that includes registering to a memory the measurement value of one at least of the sensors coupled to each position of the first conveyor when the conveyor is empty, and
   subtracting the measurement value of the initialization step, either from the measurement value of the first sensor when the first conveyor is in full load, or from the differential measurement.

5. The method according to claim 1, further comprising cleaning the belt of the first conveyor.

6. The method according to claim 1, wherein the sorting device can selectively adopt two positions:
   a first position when the measurement by the first sensor or the differential measurement is higher than the threshold value; and
   a second position when the measurement by the first sensor or the differential measurement is lower than the threshold value,
   the method further comprising one of at least:
      adopting the first position in advance when the measurement by the first sensor or the differential measurement becomes higher than the threshold value, and
      adopting the second position with delay when the measurement by the first sensor or the differential measurement becomes lower than the threshold value.

7. The method according to claim 1, further comprising pre-screening the contaminated matter upstream of the introduction of the matter on the first conveyor.

8. A device for sorting contaminated matter comprising:
   a first conveyor;
   a first sensor arranged between a supply point and a sorting point and having a sensing side that faces an upper side of the first conveyor,
   a second sensor having a sensing side that faces a lower side of the first conveyor,
   a gravitational sorting device configured to selectively adopt at least two positions, and
   a computing device configured to calculate a differential measurement by subtracting a measurement value of the second sensor from that of a measurement of the first sensor and to subject the positioning of the sorting device to the result of a comparison between a threshold value and a measurement value of a first sensor, or the differential measurement value.

9. The device according to claim 8, further comprising at least one of (i) a second conveyor, in series with the first conveyor, wherein the contaminated matter is discharged by gravity, and (ii) a storage and supply device, from which the contaminated matter can be discharged by gravity at the supply point of the first conveyor.

10. The device according to claim 9, wherein the second conveyor is slanted at a positive angle with respect to a plane of the first conveyor, in order to raise the contaminated matter with respect to a height of the supply point (A) and wherein the sorting device comprises a pendular hopper.

11. The device for sorting contaminated matter according to claim 9, further comprising at least one of:
    a casing wherein the first sensor is inserted, the casing being shielded and protecting all sides of the first sensor except for the sensing side, the sensing side being protected by a protective member, wherein if the protective member is a shielding, then an attenuation coefficient of the shielding is lower than that of the shielding of the other sides of the first sensor;
    a casing wherein the second sensor is inserted, the casing being shielded and protecting all the sides of the second sensor except for the sensing side, the sensing side being protected by a protective member, wherein if the protective member is a shielding, then an attenuation coefficient of the shielding is lower than that of the shielding of the other sides of the second sensor.

12. The device for sorting contaminated matter according to claim 8, further comprising at least one of:
    a first shielding arranged between the upper side and the lower side of the first conveyor and facing the sensor side of the first sensor, and
    a second shielding arranged between the upper side and lower side of the first conveyor facing the sensing side of the second sensor.

13. The method according to claim 1, further comprising adjusting the height of the contaminated matter on the first conveyor.

14. The device according to claim 8, further comprising a mechanical limiter configured to adjust the height of the contaminated matter on the first conveyor.

* * * * *